United States Patent
Schneider et al.

(10) Patent No.: US 11,954,956 B2
(45) Date of Patent: *Apr. 9, 2024

(54) MULTIFUNCTION SMART DOOR DEVICE

(71) Applicant: Royal Caribbean Cruises Ltd., Miami, FL (US)

(72) Inventors: Jay Schneider, Miami Beach, FL (US); Gregory Morwick, Miami, FL (US); Joey Hasty, Winter Park, FL (US); Alastair Partington, Minnetonka, MN (US)

(73) Assignees: ROYAL CARIBBEAN CRUISES LTD., Miami, FL (US); ASSA ABLOY GLOBAL SOLUTIONS AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,793

(22) Filed: Nov. 5, 2021

(65) Prior Publication Data
US 2022/0230493 A1 Jul. 21, 2022

Related U.S. Application Data

(63) Continuation of application No. 16/867,461, filed on May 5, 2020, now Pat. No. 11,170,593.

(51) Int. Cl.
*G07C 9/00* (2020.01)
*G05B 19/042* (2006.01)
(Continued)

(52) U.S. Cl.
CPC ....... *G07C 9/00563* (2013.01); *G05B 19/042* (2013.01); *G06F 21/6254* (2013.01);
(Continued)

(58) Field of Classification Search
CPC ........ G07C 9/00563; G07C 9/37; G07C 9/38; G07C 9/00571; H04N 7/186;
(Continued)

(56) References Cited

U.S. PATENT DOCUMENTS 5,541,585 A * 7/1996 Duhame ................ G07C 9/28
235/382
6,111,517 A  8/2000 Atick
(Continued)

OTHER PUBLICATIONS

Extended European Search Report for European Application No. 21172147.7, dated Oct. 4, 2021.

*Primary Examiner* — Nam V Nguyen
(74) *Attorney, Agent, or Firm* — Knobbe, Martens, Olson & Bear LLP

(57) ABSTRACT

Multifunction smart door devices may be part of a system of multifunction smart door devices installed within or near stateroom doors of a cruise ship. Each smart door device can control access to a stateroom based on facial recognition or a wireless credential and can perform other functions such as controlling stateroom personalization features, providing an electronic peephole function, allowing controlled access for authorized crew members, accommodating remote unlocking, and providing notifications. Data obtained by the smart door devices can be provided to the cruise operator for service, safety, or security purposes, such as for anonymized foot traffic analysis, hazard detection, and stateroom access auditing. Smart door device functionality may be implemented in part by customers' mobile devices.

21 Claims, 5 Drawing Sheets

(51) Int. Cl.

| | | |
|---|---|---|
| *G06F 21/62* | (2013.01) | |
| *G06Q 50/26* | (2012.01) | |
| *G06V 40/16* | (2022.01) | |
| *G07C 9/37* | (2020.01) | |
| *G07C 9/38* | (2020.01) | |
| *G08B 21/18* | (2006.01) | |
| *G08B 25/00* | (2006.01) | |
| *H04N 7/18* | (2006.01) | |

(52) U.S. Cl.
CPC ......... *G06Q 50/265* (2013.01); *G06V 40/166* (2022.01); *G07C 9/00571* (2013.01); *G07C 9/37* (2020.01); *G07C 9/38* (2020.01); *G08B 21/182* (2013.01); *G08B 25/00* (2013.01); *H04N 7/186* (2013.01); *G05B 2219/2614* (2013.01); *G06V 40/172* (2022.01)

(58) Field of Classification Search
CPC ............... G06Q 50/265; G05B 19/042; G05B 2219/2614; G06K 9/00255; G06K 9/00288; G06F 21/6254; G08B 25/00; G08B 21/182
USPC .................. 340/5.53, 5.52, 5.7, 5.82
See application file for complete search history.

(56) References Cited

U.S. PATENT DOCUMENTS

| | | | |
|---|---|---|---|
| 6,526,158 B1 | 2/2003 | Goldberg | |
| 6,801,907 B1 | 10/2004 | Zagami | |
| 6,909,921 B1* | 6/2005 | Bilger | G08B 21/0492 700/63 |
| 6,985,070 B1* | 1/2006 | Parker | G07C 9/38 340/5.82 |
| 7,116,211 B1* | 10/2006 | Parker | G07C 9/37 340/5.83 |
| 8,425,313 B2 | 4/2013 | Nelson | |
| 8,598,980 B2* | 12/2013 | Evans | G06F 21/32 340/5.82 |
| 9,057,210 B2* | 6/2015 | Dumas | G07C 9/00309 |
| 9,270,840 B2 | 2/2016 | David | |
| 9,596,084 B2* | 3/2017 | Papakipos | H04L 9/3231 |
| 9,685,012 B2* | 6/2017 | Saeedi | G07C 9/27 |
| 9,798,979 B2* | 10/2017 | Fadell | H04L 12/2825 |
| 10,127,754 B2* | 11/2018 | Child | G07C 9/00563 |
| 10,235,822 B2 | 3/2019 | Nye | |
| 10,255,774 B2* | 4/2019 | Flint | G08B 13/1672 |
| 10,274,909 B2 | 4/2019 | Lyman | |
| 10,275,587 B2 | 4/2019 | Cornick | |
| 10,380,816 B2 | 8/2019 | Landers, Jr. | |
| 10,505,756 B2 | 12/2019 | Park | |
| 10,521,988 B1 | 12/2019 | Allibhoy et al. | |
| 10,657,749 B2 | 5/2020 | Nye | |
| 10,776,613 B1 | 9/2020 | Schneider et al. | |
| 10,850,709 B1* | 12/2020 | Nagata | G07C 9/00563 |
| 11,170,593 B1* | 11/2021 | Schneider | H04N 7/186 |
| 2004/0098276 A1 | 5/2004 | Blazey | |
| 2004/0153671 A1* | 8/2004 | Schuyler | G07C 9/28 726/9 |
| 2005/0219360 A1 | 10/2005 | Cusack | |
| 2007/0183634 A1* | 8/2007 | Dussich | G06V 40/173 382/118 |
| 2007/0239722 A1* | 10/2007 | Phillips | H04L 67/306 707/999.009 |
| 2009/0157515 A1 | 6/2009 | Lafauci | |
| 2010/0078475 A1 | 4/2010 | Lin | |
| 2010/0282839 A1* | 11/2010 | Zura | G06Q 10/00 235/382 |
| 2011/0209192 A1 | 8/2011 | Leclerc Greer | |
| 2012/0158238 A1* | 6/2012 | Daley | G07C 5/00 704/E21.001 |
| 2012/0316995 A1 | 12/2012 | Davies | |
| 2013/0097038 A1 | 4/2013 | Potter | |
| 2013/0322707 A1 | 12/2013 | Phillips | |
| 2014/0063191 A1 | 3/2014 | Bataller | |
| 2014/0105466 A1 | 4/2014 | Botes | |
| 2014/0168477 A1 | 6/2014 | David | |
| 2016/0026853 A1 | 1/2016 | Wexler et al. | |
| 2016/0239733 A1 | 8/2016 | Hertz | |
| 2016/0300410 A1* | 10/2016 | Jones | B60R 25/2045 |
| 2018/0121936 A1 | 5/2018 | Madduri | |
| 2018/0225780 A1 | 8/2018 | Boss et al. | |
| 2018/0338241 A1 | 11/2018 | Li | |
| 2019/0028290 A1 | 1/2019 | Jeong | |
| 2019/0050837 A1 | 2/2019 | Della Corte | |
| 2019/0122250 A1 | 4/2019 | Panigrahi | |
| 2019/0251334 A1 | 8/2019 | Kawase | |
| 2019/0272413 A1 | 9/2019 | Eder | |
| 2019/0354763 A1 | 11/2019 | Stojancic | |
| 2019/0362169 A1 | 11/2019 | Lin | |
| 2020/0005573 A1 | 1/2020 | Yuan et al. | |
| 2020/0117156 A1 | 4/2020 | Guan et al. | |

\* cited by examiner

MULTIFUNCTION SMART DOOR DEVICE

CROSS-REFERENCE TO RELATED APPLICATIONS

The present application is a continuation of U.S. patent application Ser. No. 16/867,461, filed May 5, 2020, now U.S. Pat. No. 11,170,593, titled "MULTIFUNCTION SMART DOOR DEVICE," which is incorporated by reference herein in its entirety.

BACKGROUND

Technological Field

The present application relates to Internet of Things (IoT) devices for customers of a service provider, such as but not limited to a cruise operator or other hospitality or entertainment provider. In particular, the present application relates to multifunction smart door devices.

Description of the Related Art

Cruise ships are often described as floating cities. These ships are designed to provide every convenience and necessity to hundreds and in many cases thousands of passengers, while keeping the passengers entertained during a sailing that can range from 2 days to as many as 4 weeks. Passengers must be able to access secured accommodations such as staterooms. Furthermore, various services and/or operations associated with passenger accommodations may be desirable or necessary, such as deliveries, maintenance, dining, security, admission of visitors or crew, and the like. It is desirable to provide connected services to improve passenger comfort and efficiency.

SUMMARY

The systems, methods, and devices of this disclosure each have several innovative aspects, no single one of which is solely responsible for the desirable attributes disclosed herein. Without limiting the scope of this disclosure, its more prominent features will now be discussed briefly. After considering this discussion, and particularly after reading the section entitled "Detailed Description" one will understand how the features of this disclosure provide advantages over other hospitality solutions.

In one aspect, a smart door device for stateroom access control on a cruise ship is described. The smart door device comprises a housing disposed within or proximate to a door of a stateroom of the cruise ship, the door being unlockable by an electronic door lock; a local data store within the housing in communication, via a ship-based network, with a ship-based data store having stored thereon a plurality of customer profiles associated with individual customers embarked on the cruise ship, the local data store having stored thereon at least a portion of one or more profiles of the plurality of customer profiles, the one or more profiles associated with customers permitted to access the stateroom; a wide angle camera disposed at an exterior of the housing and configured to image a public area of the cruise ship adjacent to the door of the stateroom; a proximity sensor disposed at the exterior of the housing and configured to detect the presence of an object within the public area of the cruise ship adjacent to the door of the stateroom; and a processor within the housing and in communication with the local data store, the proximity sensor, and the wide angle camera. The processor is configured to receive, from the proximity sensor, a signal indicative of the presence of an object; capture, by the wide angle camera in response to the signal, an image of a face of a person disposed within the public area; locally generate, based on one or more facial recognition software algorithms and the at least a portion of the one or more profiles, a facial recognition result indicating that the person is one of the customers permitted to access the stateroom; and cause, in response to the facial recognition result, the electronic door lock to unlock the door of the stateroom.

In some embodiments, the at least a portion of the one or more profiles comprise one or more user stateroom preferences associated with the person, and the processor is further configured to modify a configuration of a networked appliance within the stateroom in response to the facial recognition result. In some embodiments, the one or more user stateroom preferences comprise at least one of a default climate control setting, a default in-room media setting, a default lighting setting, or a default window shade setting. In some embodiments, the processor is further in communication with one or more sensors configured to determine whether the stateroom is occupied or unoccupied, the processor further configured to modify the configuration of the networked appliance within the stateroom in response to the facial recognition result only if the stateroom is unoccupied.

In some embodiments, the wide angle camera is a video camera configured to capture video footage of the public area of the cruise ship adjacent to the door of the stateroom. In some embodiments, the processor is configured to display the captured video footage to one or more of the customers associated with the stateroom as a live stream. In some embodiments, displaying the captured video footage comprises playing the live stream on an inward-facing display of the smart door device. In some embodiments, displaying the captured video footage comprises transmitting the live stream to a mobile device associated with the one or more of the customers associated with the stateroom.

In some embodiments, the local data store further stores an identifier of one or more crew members authorized to access the stateroom. In some embodiments, the processor is further configured to allow the one or more crew members to access the stateroom based at least in part on a facial recognition result or a proximity-based credential corresponding to the one or more crew members, and based at least in part on evaluating a business rule stored in the local data store. In some embodiments, the business rule causes the processor to allow the one or more crew members to access the stateroom only during a predetermined time window, and to deny access to the stateroom for the one or more crew members outside of the predetermined time window. In some embodiments, the processor is further in communication with one or more sensors configured to determine whether the stateroom is occupied or unoccupied, and wherein the business rule causes the processor to allow immediate access to the stateroom when the stateroom is unoccupied, and allow access to the stateroom after a predetermined time delay when the stateroom is occupied. In some embodiments, the business rule causes the processor to allow access to the stateroom only if two crew members are determined to be present.

In some embodiments, the processor is further configured to cause an access event record to be stored in the local data store or in the ship-based data store in response to the facial recognition result; and cause an image or video of the person to be stored in the local data store or in the ship-based data store in association with the access event record.

In another aspect, a stateroom access control system for a cruise ship comprises a plurality of smart door devices according to the present technology, each smart door device disposed within or proximate to a door of a stateroom of the cruise ship; and a server in communication with the ship-based data store and the plurality of smart door devices.

In some embodiments, each smart door device further comprises a temperature sensor in communication with the processor, each processor configured to send a fire notification to the server when the temperature sensor detects a temperature greater than a predetermined fire alert threshold, and wherein the server is configured to determine a fire location based on fire notifications received from a plurality of the smart door devices.

In some embodiments, the processor of each smart door device is further configured to detect, based on one or more facial recognition algorithms, the presence of individual faces of people passing by the door of the stateroom within the public area; and store, in the local data store, anonymized foot traffic records including an anonymous count corresponding to each individual face. In some embodiments, the processor of at least one smart door device of the plurality of the smart door devices is further configured to determine a direction of travel associated with each individual face. In some embodiments, the processor of each smart door device is further configured to transmit the anonymized foot traffic records to the server, and the server is configured to perform an aggregated foot traffic analysis based on the anonymized foot traffic records received from the smart door devices.

In some embodiments, at least one smart door device of the plurality of the smart door devices further comprises a door position sensor configured to send a notification to the processor when the door of the respective stateroom is open for longer than a threshold time, wherein the processor of the at least one smart door device is further configured to transmit a security alert to the server in response to the notification.

In some embodiments, each smart door device further comprises a thermal imaging sensor in communication with the processor, each processor configured to determine a body temperature of the person using the thermal imaging sensor in response to detecting the person.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Figure 1:
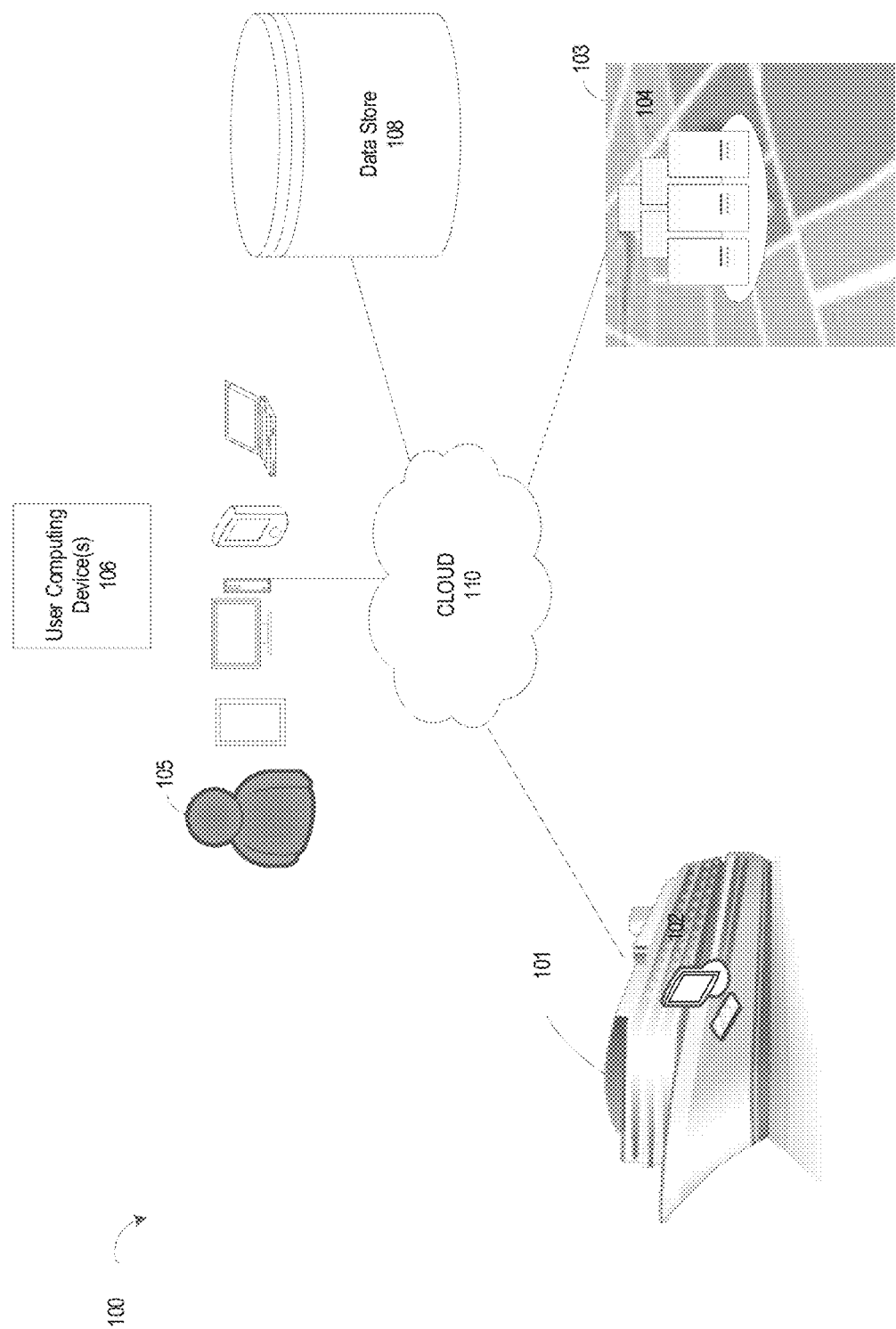
FIG. 1 shows a diagram of a networked computing system comprising a ship-based computing system and a shore-based computing system in accordance with the present technology.

Customers aboard cruises or other voyages typically spend time in private or shared staterooms or other accommodations. For example, a customer or a group of customers travelling together may be assigned to a stateroom in which they may sleep, eat, enjoy recreational activities, store their belongings, or otherwise make use of the stateroom space. Staterooms are typically access-controlled. For example, a customer may gain access to the customer's stateroom by providing an identity credential such as an identification card, which may include an RFID tag, chip, or magnetic strip, by biometric authentication such as facial recognition, etc. Thus, each stateroom or other shipboard accommodation typically includes an access control device configured to verify the identity of a person trying to access the stateroom. An access control device may be configured to grant access, for example, to the customer or customers assigned to the stateroom, to other customers who have otherwise been granted access privileges for the stateroom, and/or to crew members of the ship who may need to access the stateroom such as for cleaning, maintenance, deliveries, or other services. However, existing access control devices typically have limited functionality, and are configured only to read an identification card and control an electronic door lock.

In some embodiments of the present technology, staterooms or other accommodations may be equipped with a smart door device capable of performing a variety of functions for the customer(s) assigned to the stateroom, for other customers, and/or for the crew or operators of the ship. For example, in some embodiments, a smart door device is configured to perform functions including authentication of customers for access control, security functions, personalization of stateroom amenities, live view or electronic peephole functionality, location notification, anonymized foot traffic analysis, interfacing with other door hardware, and/or hospitality alerts, etc. The multifunctional smart door devices, services, and systems disclosed herein can thereby provide an improved stateroom experience that enhances a customer's enjoyment of a cruise or other hospitality interaction. In some embodiments, various functions of the smart door device may utilize facial recognition technology. Because the local processor of a stateroom smart door device may generate a facial recognition result based on only a small subset of stored profile information for the customers associated with a stateroom, rather than the profile information for all customers on the ship, this local generation of facial recognition results may be performed quickly and with relatively little processing power required. Additionally, the mart door devices described herein may provide access to authorized crew members (e.g., for scheduled service, deliveries, or maintenance), making it easier for requested services and deliveries to occur while a guest is elsewhere enjoying the amenities of the ship rather than waiting for a crew member to arrive. Accordingly, the facial recognition implementations described herein may be used throughout the duration of a cruise sailing or other event to improve customer experiences by providing a multifunctional device that can enhance the enjoyment, comfort, and functionality of stateroom accommodations, improve customers' safety and security associated with their stateroom accommodations, avoid the necessity of carrying a wearable or other access credential while on a cruise, and provide anonymized data to a cruise operator for further enhancement of safety and security of all passengers and crew aboard Advantageously, the smart door devices, services, and systems described herein utilize unique aspects of computing systems integrated within a ship or a cruise operator's fleet to enhance the reliability of facial recognition systems. As will be described in greater detail, confidence level enhancement of facial recognition results based on association with additional data may advantageously allow the facial recognition services and systems described herein to more reliably achieve facial recognition results with sufficient confidence levels to replace other forms of identity credentialing. Moreover, the services and systems of the present technology may utilize additional available information, such as a known set of passengers, known or observed interpersonal connections, known itineraries, ongoing data capture, or the like, to further improve confidence levels associated with detection events. A cruise event is uniquely suited to enhance the reliability of facial recognition services and systems, as a cruise has a consistent set of customers throughout the duration of the cruise, the set of customers is limited to the capacity of a cruise ship (e.g., between approximately 1000 and 10000 customers), and customers embarking on a cruise experience are likely to expect and adhere to a requirement of having a photo taken prior to beginning the cruise experience for initial data capture.

Although embodiments of the smart door devices, services, and systems described herein are described in the context of providing access, goods, and/or services to customers of a cruise operator, it will be understood that the present technology is not limited to this class of customer, this type of service provider, or the particular cruise context. As will be described in detail below, features of the present technology can be employed in many other contexts, such as but not limited to entertainment, hotel, and other hospitality services and systems; banking and other financial services and systems; healthcare services and systems; and health information technology (HIT) services and systems. The present technology can be implemented in any system where it is desirable to implement network connected devices for enhanced functionality in access-controlled spaces.

Customers of facial recognition services and systems described herein can be passengers on a cruise or similar voyage or transport, guests at a hotel or similar destination, or patrons at a retreat or similar event. The operators of the cruise, hotel, and retreat services may offer a variety of items or experiences customers may purchase or participate in. In order to improve ease of customer access to accommodations, selected activities, food, beverages, and the like, the operators may use a computing and/or database system that includes a system of touchpoints throughout the cruise, hotel, or retreat location. Touchpoints are configured to recognize individual customers based on facial recognition data and/or historical information acquired about a plurality of customers, including the specific customer.

Exemplary Term Descriptions

To facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary definitions.

Data Store: Includes any computer readable storage medium and/or device (or collection of data storage mediums and/or devices) that stores data. Examples of data stores include, but are not limited to, optical disks (for example, CD-ROM, DVD-ROM, and so forth), magnetic disks (for example, hard disks, floppy disks, and so forth), memory circuits (for example, solid state drives, random-access memory ("RAM"), and so forth), and/or the like. Another example of a data store is a hosted storage environment that includes a collection of physical data storage devices that may be remotely accessible and may be rapidly provisioned as needed (commonly referred to as "cloud" storage). Any data store as described herein may be or include a single storage medium and/or device, or may be distributed among a plurality of data storage mediums and/or device located locally or remotely.

Customer: Depending on the context, "customer" may refer to a person, such as an individual, consumer, or user that interacts with services and systems described herein. A customer can include any entity that accesses the services of a service provider, such as but not limited to a cruise ship passenger, a guest services attendant, a food and beverage attendant, a cashier, a maintenance technician, or the like. The terms "user," "individual," "consumer," "guest," "passenger," and "customer" can be interpreted to include single persons, as well as groups of users, such as, for example, married couples or domestic partners, organizations, groups, and business entities. These terms may be used interchangeably. In some embodiments, the terms refer to a computing device of a user rather than, or in addition to, an actual human operator of the computing device.

Identifier: Depending on the context, "identifier" may refer to a data item uniquely identifying a customer, a crew member, a ship, a product, a location, a stateroom, an item, a touchpoint or other connected device, or the like. In various embodiments, an identifier may comprise a set of alphanumeric characters stored, for example, in a data store. In one example, each customer may have a corresponding customer profile stored in a data store at a ship-based data center. The customer profile may include an alphanumeric customer identifier stored in association with one or more other information items, such as a stateroom identifier, identifiers of other known travel party members, identifiers of purchased products or itinerary items, etc. The term "identifier" as used herein may refer to a set of characters and/or one or more physical bits of a non-transitory computer readable medium having the set of characters stored thereon.

Facial recognition result: A facial recognition result encompasses information produced by a facial recognition system based on one or more captured images of a person. For example, a facial recognition result may include an identifier of an individual customer determined from the one or more captured images based on a collection of data associated with the customer and through application of a machine learning process comparing that data with other data (e.g., data of a plurality of other customers). In some implementations, the facial recognition result may include a result strength. The strength may indicate a confidence level in the facial recognition result identified by a computing system. For example, the strength may include a numerical value (e.g., a value between 0 and 1) indicative of a computing system's confidence level in the accuracy of the facial recognition result. As such, the strength may be included to allow systems receiving the recommendation to decide how much weight or credence to give the facial recognition result. As will be described in greater detail, certain access-granting touchpoints may require relatively higher confidence levels in facial recognition results as a condition of granting access. For example, the confidence level required to gain access can depends on individual requirements of the touchpoint locations.

Cruise operator: Depending on the context, "cruise operator" may refer to a company or entity that owns or operates one or more cruise ships, and/or to any agent or group of agents thereof, or systems operated thereby. For example, data provided to a cruise operator may include data or notifications sent to one or more crew members, a group or subdivision of crew members such as a maintenance crew, or a computer system such operated by or in communication with the owner, operator, or crew of the cruise ship.

Smart Door Devices, Services, and Systems of the Present Technology

Transit providers (for example, companies that provide and/or coordinate cruises, such as but not limited to cruise operators and travel planning services) seek to provide additional benefits and value to prospective and existing passengers on the trips that they schedule, operate, and/or coordinate. Often, providing such benefits and value may include offering comfortable, convenient, and/or luxurious stateroom accommodations including ease of access, personalization features, delivery of services, and prompt maintenance, as well as a feeling of safety and security within the accommodation. Customer experiences in taking advantage of such accommodations, as well as in all aspects of a cruise experience, may be enhanced by simplifying and/or streamlining customers' access to accommodations.

In some implementations of the present technology, smart door devices, services, and systems are configured to implement facial recognition technology. Individual customers may have one or more photos taken at an embarkation device to develop facial recognition data including an initial set of features for identification. Subsequent interactions with touchpoints, cameras, and other devices during the cruise may yield additional image data which can be used to augment the initial facial recognition data, such that the customers can be identified with a greater confidence level in future interactions with touchpoints. In some cases, facial recognition data for a customer may be retained after the conclusion of a cruise and may be used as initial facial recognition data for the customer when the customer returns for a subsequent cruise. Thus, implementations of the facial recognition aspects described herein are advantageously optimized for the entire customer lifecycle of the cruise experience—from initial data capture at embarkation, to a passenger that is currently engaged in the cruise experience in real-time, to returning customers who have traveled on a previous cruise of the cruise operator. Embodiments of facial recognition technology provided herein are provided to illustrate examples of these optimized interactions, and are not intended to limit the scope of the present technology.

In some embodiments, smart door devices, services, and systems may further take advantage of a data store including customer information associated with customers that are on board a particular cruise. The data store of customer information may be populated based, at least in part, on information from a profile unique to each customer, corresponding travel information for each customer and/or additional customers known to be traveling with each customer, historical product selection/purchase information for each customer, and/or social media data of each customer. In some embodiments, the corresponding travel information and the historical product information are stored in association with the unique customer profile. The customer profile can store any suitable information specific to the customer, including but not limited to loyalty tier, loyalty preference, and certain types of demographic information. The profile can be stored in the data store of historical customer information. Further details of example implementations of smart door devices, services, and systems and methods of the present technology are provided below.

Example Smart Door Computing Systems in Accordance with the Present Technology

FIG. 1 illustrates a diagram of an example networked computing system 100 within which the smart door devices, services, and systems described herein may be implemented. The system 100 includes a ship-based computing system 102 which may be in communication with a shore-based computing system 104 via a cloud-based or wireless network 110, according to this exemplary embodiment. In some embodiments, the ship-based computing system 102 is located on a ship 101 (or other mass transport, such as a train, a shuttle, a bus, a plane, and so forth) configured to transport a plurality of individuals or customers ("customers") during a trip or voyage ("sailing"). The ship-based computing system 102 may include any number of individual independent and/or networked computing devices located within the ship 101. For example, some or all staterooms within the ship may each be equipped with a smart door device that forms a portion of the ship-based computing system 102. The shore-based computing system 104 is located in a shore-based facility 103 and is associated with a service provider, such as a company or entity that operates the ship 101. Alternatively, or additionally, the shore-based computing system 104 may include a cloud-based database or data store 108 with which the ship-based computer system 102 communicates at least periodically while in port or at sea. Alternatively or in addition, the shore-based computing system 104 may include a cloud-based computing system with which the ship-based computer system 102 communicates at least periodically.

The system 100 may also include a plurality of user computing devices 106 that are operated by customers of the service provider. The user computing devices 106 may include any one of a smartphone, a tablet, a laptop, a desktop, a personal digital assistant (PDA), a vehicle communication system, a smartwatch, or any other electronic device. The user computing device 106 allows a user 105 (for example, the customer, as described above) to request products such as experiences, items, activities, entertainment and dining options, and events (collectively referred to herein as "products") before or while the customer 105 is embarked on the ship 101 during a sailing. In some embodiments, communications between the ship-based computing system 102 and the shore-based computing system 104 are used to provide information to the ship-based computing system 102 regarding facial recognition profiles, as well as customer information that may be stored at the shore-based computing system 104 and/or the data store 108. Any suitable communications arrangement can be implemented in embodiments of the present technology.

In some embodiments, the ship 101 transports the plurality of customers over a period of time (for example, for a duration of the sailing). At various times prior to and during the sailing, the customers on the ship 101 review various products offered onboard the ship as well as during port visits, and potentially book, reserve, purchase, or add one or more products to the customer's cruise itinerary. As described above, such products can include items, admission to an event or an experience such as a performance or shore excursions, entertainment options, specialty dining packages, and menu items, just to name a few. Shipboard events and experiences can include, for example, spa services, classes, childcare services, live performances, movie showings, organized sports activities and contests, dining experiences, activities with limited time slots and/or specific restrictions (such as wakeboarding, bungee jumping, rock climbing, etc.). It will be understood that shipboard events and experiences also include events for which no reservation or booking is required for a customer to participate, for example welcome parties, informational presentations for port calls, and walk-in dining experiences.

Items can include, for example, retail items sold in the ship's store, items sold during performances, items sold by the service provider ashore during port visits, or any other item a customer may evaluate and purchase during the customer's cruise lifecycle. It will be understood that items can include intangible items, such as trip insurance, digital photos, reservations for a future sailing, etc.

Some products are offered and/or available for purchase or reservation at any time by the customer using, for example, a user computing device 106, while some products are offered and/or available for purchase or reservation at selected times and dates. Some products are available in unlimited, or virtually unlimited quantities, while some products are available in limited quantities. Any of the products offered and/or available may require a check-in or other identification of the customer at the time of attending the experience, receiving the item, etc.

The shore-based computing system 104 and/or the ship-based computing system 102 can also store data relating to each customer that is embarked on or is scheduled to embark on a particular sailing offered by the cruise operator. Customer data can include, but is not limited to, demographic information of the customer; historical information on reservations, purchases, and bookings by the customer on a previous sailing; information on products purchased, booked, or reserve by the customer for an upcoming sailing; and information on other passengers that are associated with the customer on a prior or upcoming sailing. It will be understood that such examples are not intended to be limiting, and any suitable information that can enhance recommendation services and systems described herein can be implemented.

Figure 2:
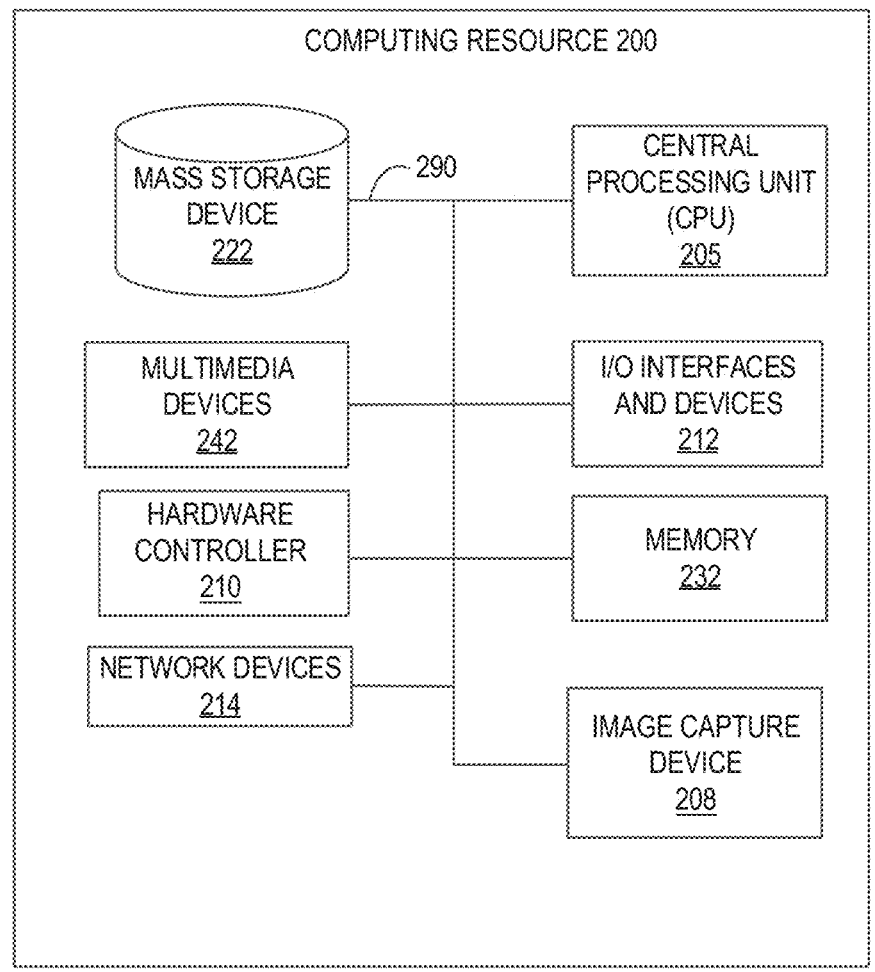
FIG. 2 shows a block diagram of exemplary components of a computing resource participating in the networked computing system of FIG. 1 in accordance with the present technology.

FIG. 2 illustrates a block diagram of exemplary components of a computing resource 200 participating in the networked computing system 100 of FIG. 1, according to an exemplary embodiment. The computing resource 200 may be used by, with, or as a component of, for example, one or more of the user computing devices 106 or the ship-based computing system 102. For example, the computing resource 200 may include, may be in communication with, and/or may be integrated within a device such as a stateroom smart door device, an embarkation device, a mobile touchpoint or crew device, and/or a standalone monitoring device located on or within the ship. The computing devices and systems include, for example, a computing device or system that is IBM, Macintosh, or Linux/Unix compatible or a terminal or workstation. In one embodiment, the computing system 200 includes one or more central processing units ("CPUs") 205, which may each include a conventional or proprietary microprocessor. In some embodiments, the CPU 205 may perform various computations, associations, etc., of data stored in a data store. Accordingly, the CPU 205 may enable the computing resource 200 to process information in a data store and generate information for transmission to and between other devices.

The computing resource 200 further includes one or more memory 232, such as random access memory ("RAM") for temporary storage of information, one or more read only memory ("ROM") for permanent storage of information, and one or more mass storage device 222, such as a hard drive, diskette, solid state drive, or optical media storage device. Typically, the components of the computing resource 200 are connected using a standard based bus system 290. In different embodiments, the standard based bus system 290 could be implemented in Peripheral Component Interconnect ("PCI"), Microchannel, Small Computer System Interface ("SCSI"), Industrial Standard Architecture ("ISA"), Extended ISA ("EISA"), and networked architectures, for example. In addition, the functionality provided in the components and modules of computing resource 200 may be combined into fewer components and modules or further separated into additional components and modules than as shown in FIG. 2.

The computing resource 200 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing resource 200 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing resource 200 may include one or more commonly available input/output (I/O) devices and interfaces 212, such as a keyboard, mouse, touchpad, and printer. In one embodiment, the I/O devices and interfaces 212 include one or more display devices, such as a monitor, that allows the visual presentation of data to a user. More particularly, a display device provides for the presentation of the user interface or GUI, application software data, and multimedia presentations, for example. The computing resource 200 may also include one or more multimedia devices 242, such as speakers, video cards, graphics accelerators, and microphones, for example.

In the embodiment of FIG. 2, the I/O devices and interfaces 212 provide a communication interface to various external devices. The computing resource 200 is electronically coupled to one or more networks, for example one or more of a LAN, WAN, and/or the Internet, via a wired, wireless, or combination of wired and wireless, communication links provided by one or more networking devices 214. For example, the computing resource 200 in this implementation may be electronically coupled to the network 110 and/or to an internal network of the ship-based computing system 102 of FIG. 1 via a wired or wireless connection using the networking devices 214. Other implementations are possible. Using the networking devices 214, the computing system 200 may communicate over networks with various computing devices and/or other electronic devices via wired or wireless communication links. In some embodiments, the networking devices 214 allow one computing system (for example, the ship-based computing system 102) to communicate with another computing system (for example, the shore-based computing system 104). Additionally, or alternatively, the networking devices 214 may allow the computing systems 102 and/or 104 to communicate with the user computing devices 106.

In some embodiments, the I/O devices and interfaces 212 may generate or provide the user interface (UI). The UI may allow for customers of the user computing devices 106 to browse, select, schedule, reserve, and purchase products. In some embodiments, the UI allows the customers to update customer information, for example profile information, profile preferences, interests, and so forth. In some embodiments, the UI allows for operators of the ship-based computing system 102 (e.g., crew members or other agents of the ship operator) to perform functions such as reviewing stored customer information, providing items or services based on facial recognition results, or identifying customers on the ship.

Embodiments of the computing resource 200 include various modules that will be described with reference to non-limiting examples. It will be understood that implementations of the facial recognition services and systems described herein are not limited to computing systems that only include these exemplary modules. In general, a "module" refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the user computing devices 106, the ship-based computing system 102, and the shore-based computing system 104, for execution by the computing resource 200. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware, or a combination thereof. Generally, the modules described herein refer to logical modules that may be combined with other modules or divided into sub-modules despite their physical organization or storage.

In various example embodiments of FIG. 2, for example, in which the computing resource 200 is a smart door device or a user computing device, or operates a ship-based touchpoint or monitoring device, an image capture device 208 is in communication with the central processing unit 205. The image capture device 208 is configured to capture images of one or more people in the vicinity of the computing resource 200. In some embodiments, the captured images may be sent to another device such as a central server or data center of the ship-based computing system 102 for analysis to determine a facial recognition result, or the captured images may be analyzed locally at the computing resource 200. The image capture device 208 may be configured to capture images continually on a periodic basis, and/or may be configured to capture images on an event-based basis, such as at a predetermined time, based on a user request to capture one or more images, based on motion detection, and/or based on an input received from another device within the ship-based computing system 102.

In further example embodiments of FIG. 2 in which the computing resource 200 operates a ship-based touchpoint, a hardware controller 210 may be in communication with the CPU 205 to cause actuation of a physical device such as an access point or a barrier, based on a facial recognition result. For example, if the computing resource 200 is a touchpoint integrated with a stateroom door, the hardware controller 210 may cause a lock of the stateroom door to unlock based on a facial recognition result indicating that a person at the door is authorized to enter. In other examples, the hardware controller 210 may actuate a movable barrier such as a turnstile in an access-controlled environment, may cause an automated dispensing or vending device to release an item to a customer, etc.

Figure 3:
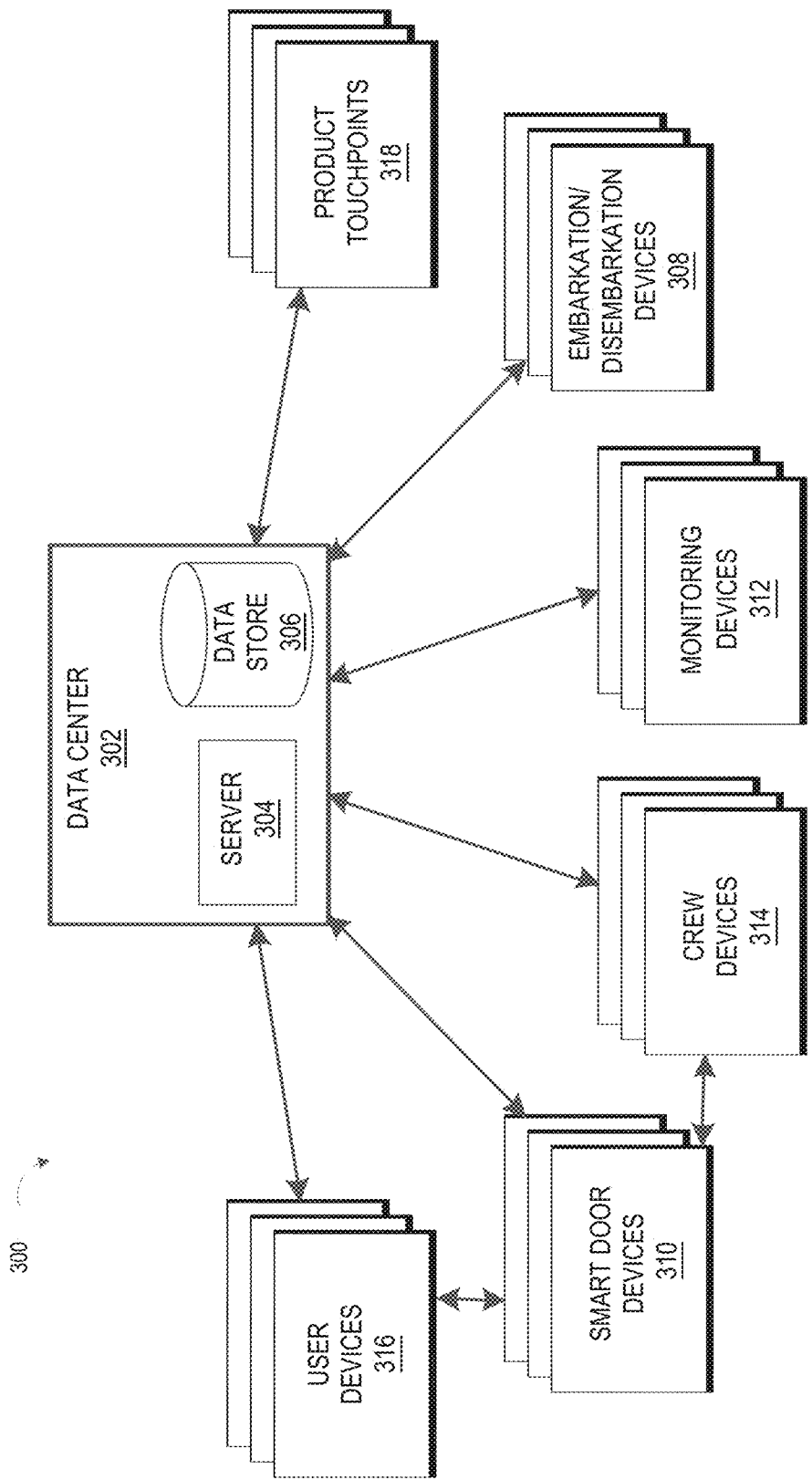
FIG. 3 shows a block diagram of a ship-based computing system comprising a networked system of computing resources, including one or more smart door devices, integrated within a vessel.

FIG. 3 shows a block diagram of a ship-based computing system 300 such as ship-based computing system 102 of FIG. 1, including a networked system of computing resources integrated within a ship, according to an exemplary embodiment. The ship-based computing system 300 includes a data center 302, including a server 304 and a data store 306, as well as various touchpoints and connected devices located throughout the ship. Example touchpoints and other connected devices can include, but are not necessarily limited to, embarkation/disembarkation devices 308, smart door devices 310 such as those installed in staterooms, monitoring devices 312, crew devices 314, user devices 316, and product touchpoints 318. Smart door devices 310 can be installed in various types of doors in addition to guest stateroom doors, such as crew cabin doors, doors to crew-only facilities, and doors to maintenance, propulsion, medical, navigation, or any other facility where access is to be restricted to some degree. Further, although not illustrated in FIG. 3, it will be understood that the components of the ship-based computing system 300 described with reference to FIG. 3 are scalable and can be replicated on each ship in the cruise operator's fleet of ships. Thus, although the networked system 300 is explained below with reference to a single ship, the networked system 300 can include multiple ship-based computing systems 300 deployed across a fleet of ships, each communicating with a shore-based computing system 104 as shown in FIG. 1.

The data center 302 can include one or more computing devices, including at least a server 304 and a data store 306. The server 304 is configured to communicate via wired and/or wireless communications with any of the touchpoints and connected devices in the networked system 300. The server 304 and/or one or more other computing devices of the data center 302 are configured to perform various processing, analysis, and facial recognition operations as described herein. The data store 306 stores customer information for individual customers such as facial recognition data, travel party information, itinerary information, user stateroom preferences, tracking information, interaction information, and/or linked device information. The data store 306 may further store other information such as services or crew access scheduled for individual staterooms, hospitality alert information, traffic analysis results, or any other data for or generated by the various networked devices described herein.

Facial recognition data stored in the data store 306 may include information specific to each customer, such as image data corresponding to known images of the customer, landmarks, features, or other geometric information associated with the customer's facial appearance, and/or any other information usable by facial recognition algorithms to recognize the customer from subsequently captured images of the customer. Accordingly, it will be understood that the facial recognition implementations described herein need not necessarily rely on stored images of customers.

Travel party information may include information identifying, for an individual customer, other customers known to be associated with the customer. Travel party information may include identifiers corresponding to the other customers of a group reservation, and/or may include identifiers corresponding to travel party members indicated by the customer or a member of the customer's travel party.

Itinerary information may include details of all products on the customers' itineraries for customers on the sailing of the ship. Details of products in customers' itineraries can include any applicable parameter, depending on the nature of the particular product that the customer reserved, booked, or purchased. For example, the itinerary information can include one or more of a name of a product, a location of a product, a start time of a product, an end time of a product, and a duration of a product.

User stateroom preferences may include, for example, room access preferences, HVAC or climate control preferences, service or delivery requests, stateroom lighting preferences, in-room media preferences, or the like. User stateroom preferences may be stored for an individual user or stateroom, and may include one or more default settings, one or more user-selected settings, or a combination of default settings and user-selected settings.

Tracking information may include historical data regarding previous known locations of a customer. In one implementation, tracking information includes a list of time-stamped locations where the customer's location was verified during the cruise. Tracking information may be received from, or determined based on, data received at the data center 302 from touchpoints or connected devices throughout the ship with which the customer has interacted. Interaction information may include further information regarding such interactions with touchpoints or connected devices.

Linked device information may include information identifying user devices 316, and information linking individual user devices 316 to individual customers or groups of customers. For example, a mobile device such as a tablet computer or cell phone belonging to a customer may be identified by an identifier in the linked device information and associated with a customer identifier. In some embodiments, linked device information for each device is obtained when a customer aboard the ship connects a user device 316 to an onboard wireless network. The customer may be prompted to enter identifying information in order to sign onto the wireless network, thus providing to the data center 302 the necessary information to associate the linked user device 316 and the customer.

Embarkation/disembarkation devices 308 may be computing devices consistent with the computing resource 200 of FIG. 2. Embarkation/disembarkation devices 308 may be located at locations where customers embark or disembark from the ship and configured to interact with customers as they embark or disembark. In some embodiments, embarkation/disembarkation devices 308 may be located in an area near an embarkation/disembarkation point of the ship, such as in a cruise terminal, on a pier, and/or in any facility that processes or interacts with customers as they embark or disembark from the ship. In some embodiments, separate embarkation devices and disembarkation devices may be provided, or may be combined in a single embarkation/disembarkation device.

The embarkation/disembarkation devices 308 may be used for initial data capture for a customer as the customer embarks for the first time. Thus, the image capture device 208 may be configured to obtain one or more relatively high-quality images of the customer's face to provide sufficient data for subsequent facial recognition events. Accordingly, the image capture device 208 of an embarkation/disembarkation device 308 may include a still or video camera located at approximately face level to obtain a centered (e.g., passport-style) photograph of each customer. In some embodiments, the height of the image capture device 208 may be adjustable to obtain images of sufficient quality of customers of various heights. Multiple cameras may be included, for example, to simultaneously capture front and side views of a customer's face.

The I/O interfaces and devices 212 of each embarkation/disembarkation device 308 may include an input such as a graphical user interface or the like, to permit manual operation by a device operator. For example, an operator may instruct each arriving customer to stand and look into the image capture device 208. The operator may then use the user interface to cause the image capture device 208 to take one or more photos of the customer before the customer proceeds. The embarkation/disembarkation device 308 can transfer the one or more photos to the data center 302, where they may be stored in association with a customer profile or other data structure in the data store 306. In some embodiments, the customer profile may further be updated to indicate an "onboard" status of the customer.

Embarkation/disembarkation devices 308 may further be configured for disembarkation operations, for example, to identify individual customers as they disembark. In some embodiments, embarkation/disembarkation devices 308 may also be used to identify customers temporarily leaving or returning to a ship at an intermediate port of call. For example, when a ship arrives at a port such as an intermediate port of call on a cruise, embarkation/disembarkation devices 308 may be located at each exit point such that each customer leaving the ship temporarily at the port passes through an embarkation/disembarkation device 308. In other embodiments, other devices such as crew devices 314 may be used to monitor customers temporarily leaving and returning to the ship at intermediate ports of call. The image capture device 208 may include a still or video camera configured to capture images on a continuing basis as customers disembark. Facial recognition algorithms at the server 304 and/or at each embarkation/disembarkation device 308 can analyze the captured images to identify each customer leaving the ship. A temporary exit event may be recorded and stored in association with the customer and a timestamp in the data store 306. When each customer returns to the ship, the customer can be photographed and identified at the same or a different embarkation/disembarkation device 308 or crew device 314, and the customer's return may be recorded in the customer profile at the data store 306. Accordingly, the present technology may allow the computing system 300 to reliably determine whether all customers have returned to the ship prior to leaving a port, and to further identify which individual customers may still be ashore if less than all passengers have returned. When used at a time of disembarkation, the present technology may further allow the computing system 300 to reliably determine whether all customers have disembarked prior to allowing passengers for a subsequent sailing to embark.

Smart door devices 310 may be computing devices consistent with the computing resource 200 of FIG. 2. Further details of computing resources adapted to serve as smart door devices 310 will be described with reference to FIGS. 4-5B. The smart door devices 310 may be located at stateroom entrances (e.g., on or within a door and/or a wall adjacent to or near a door) and may be configured to control access to individual staterooms aboard the ship based on facial recognition, other biometric authentication, and/or based on a mechanical or wireless credential. A hardware controller 210 of a smart door device 310 may be configured to actuate a door lock (such as but not limited to an electronic door lock) to prevent or provide access to the associated stateroom. The image capture device 208 of the smart door device 310 can include an outward-facing camera configured to capture an image of the face of a person requesting access to the stateroom and/or to provide a live view to a user within the stateroom. Presence of a person within a particular distance of the stateroom camera and/or within a particular volume or space surrounding the stateroom camera may be deemed a request to access the stateroom. In another example, a person actuating or pressing a button or other input device at the stateroom camera location may be deemed a request to access the stateroom. Other implementations of access requests are possible, such as inserting a mechanical key into a lock, placing an electronic credential such as a radio frequency identification (RFID) or near field communication (NFC) device in proximity to a corresponding reader within the stateroom smart door device 310.

Upon capturing an image of a person attempting to gain access to the stateroom, the stateroom smart door device 310 may transmit the image to the data center 302 via networking device 214. At the data center 302, the image may be analyzed using a facial recognition algorithm to identify the person as a particular customer. If a customer identity is verified, the data center 302 may further determine whether the identified customer has access privileges for the stateroom associated with the smart door device 310. For example, the stateroom smart door device 310 may query the data store 306 to determine if an identifier of the particular stateroom is stored in association with a customer profile of the particular identified customer, which may indicate that the customer has access privileges for the stateroom. If the identified customer does have access privileges for the stateroom, the access request is granted. As will be described in detail below, in some cases, access is granted only if the identification of the customer is based on a facial recognition result having a confidence level greater than a predetermined threshold confidence level. For example, the server 304 may send a control message to the smart door device 310 that causes the hardware controller 210 to unlock the stateroom door. Accordingly, the present technology may allow customers or others to access staterooms using a facial identification, rather than requiring customers to carry a physical identity credential (for example, a key card or wearable device) each time they leave their staterooms.

In some embodiments, a smart door device 310 and/or a stateroom access control system including a smart door device may use local processing or a combination of remote and local processing to control access to a stateroom. For example, the stateroom door may be lockable and unlockable by an electronic door lock. The electronic door lock may be configured to unlock based on receiving a digital key. The electronic door lock may further be configured to communicate with a database storing the digital keys for the electronic door locks of the ship. When a stateroom door is to be unlocked, the smart door device 310 and/or a computing device of the data center 302 may cause the corresponding digital key to be transmitted from the database to the electronic lock such that the electronic lock unlocks the stateroom door upon receipt of the digital key. Suitable electronic door locks are made, for example, by ASSA ABLOY®.

The smart door device 310 and/or stateroom access control system may further include a local data store in which customer profile information can be stored. For example, the local data store may store the customer profiles, or portions of the customer profiles (e.g., only the facial recognition data required to generate facial recognition results) of those customers associated with and permitted to access the stateroom. The data store may further store information associated with crew members permitted to access the stateroom such as, for example, maintenance technicians, cleaning staff, product or service delivery personnel, or others permitted to enter the stateroom generally or within a predetermined time window. The customer profile information in the local data store may be received from the data center 302 at the beginning of a sailing, and/or may be updated later on an event-based or periodic basis if changes are made to the set of customers granted access to the stateroom. For example, one or more customers may be added or removed from the set of customers to be allowed to access the stateroom, and the data center 302 may cause customer profile information to be added to or removed from the local data store to reflect the changes. A crew member permitted to access the stateroom may be added to the set of customers allowed to access the stateroom at the beginning of a predetermined time window (e.g., a time window during which maintenance or another service is scheduled), and may be removed from the set at the end of the time window.

In operation, the stateroom smart door device 310 may include a wide angle camera (e.g., with a 180 degree field of view) positioned to image the surrounding public area, such as a hallway or passageway outside the stateroom. It will be understood, however, that other suitable cameras can be implemented. When a person is located within the imaged area, the camera creates an image of the face of the person and sends the image to the processor of the stateroom smart door device 310. Responsive to receiving the image, the processor of the stateroom smart door device 310 can generate a facial recognition result using the same or similar facial recognition algorithms to those used at the data center 302 for remote generation of facial recognition results. If the facial recognition result indicates that the imaged person is a customer allowed to access the stateroom, the local processor may then communicate with the data center 302 and/or the digital key database to cause the appropriate digital key to be sent from the digital key database to the electronic lock to unlock the stateroom door.

Advantageously, because the local processor of the stateroom smart door device 310 is generating a facial recognition result based on only the small subset of stored profile information for the customers associated with the stateroom, rather than the profile information for all customers on the ship, this local generation of facial recognition results may be performed quickly and with relatively little processing power required. The stateroom smart door device 310 and/or access control system may further include a local power supply configured to supply electrical power in the absence of ship power (e.g., if a ship-based power supply is interrupted locally or across the entire ship). Thus, the combination of a local power supply, local data store, and local processor may permit customers to have uninterrupted access to their staterooms in the event of the loss of ship power, loss of network connectivity, or other system failures that might otherwise inhibit operation of the ship-based facial recognition systems and methods.

Monitoring devices 312 may be computing devices consistent with the computing resource 200 of FIG. 2. In some embodiments, monitoring devices 312 may be passive detection devices configured to identify customers traveling throughout the ship, but not configured to interact physically with the customers. In one example, monitoring devices 312 include connected observation or CCTV cameras located in public areas of the ship, such as corridors, decks, activity areas, dining areas, bars, or the like. Monitoring devices 312 may have image capture devices 208 including cameras configured to capture video or periodic still images of an area on or within the ship. Obtained video or still images may be analyzed at the CPU 205 of the monitoring device and/or at the data center 302 to identify portions of the images corresponding to faces, and to identify customers based on the identified faces in the images. When a customer is positively identified, a location (e.g., corresponding to the location of the monitoring device 312) and a timestamp (e.g., a timestamp received from the monitoring device 312 with the image) may be stored in the data store 306 as a tracking information item in the customer's profile.

Crew devices 314 may be computing devices consistent with the computing resource 200 of FIG. 2. Crew devices 314 are stationary or mobile devices configured to be operated by ship crew members or other employees or operators working on the ship. For example, a bartender in a bar aboard the ship may use a crew device 314 as or in conjunction with a point of sale terminal. The crew device 314 may be able to identify a customer ordering a drink, and indicate to the bartender whether the customer is old enough to order an alcoholic beverage, whether the customer has purchased a beverage package, whether to incur an a la carte charge for the beverage, etc. (e.g., the indication may comprise displaying a message to the bartender at an output device such as multimedia device 242). Accordingly, the image capture device 208 of the crew device 314 may be an outward-facing camera configured to capture a still image of a customer based on an input from the user of the crew device 314. The captured image is sent via the networking device 214 to the data center 302, where the customer can be identified using implementations of facial recognition services and systems described herein. In the non-limiting example of a crew device 314 in a bar, the data center 302 may determine whether the customer has purchased an entitlement such as a beverage package based on information in the customer profile in the data store 306. Based on the determination, the crew device 314 provides an instruction to the bartender using a multimedia device 242 such as a display. In another non-limiting example, a crew device 314 is a camera used by an onboard photographer to photograph customers or groups of customers (e.g., to provide souvenir photos). The data center 302 may determine the identity of one or more customers that were photographed, and may further cause the photograph to be stored at the data store 306 in association with the customer profiles corresponding to the identified customers. Some crew devices 314 may include or be in communication with other devices used by crew members, such as mobile devices, augmented reality devices, or other portable devices carried by crew members. Further applications of crew devices are described in greater detail below.

User devices 316 may be computing devices consistent with the computing resource 200 of FIG. 2. In some embodiments, user devices 316 may be customer-owned devices brought on board by the customers, such as personal cell phones, tablet computers, laptop computers, or the like. User devices 316 may include networking devices 214 through which the user devices 316 may connect to a ship-based network, such as a wireless network. Upon connecting a user device 316 to the wireless network for the first time, a user (e.g., a customer) may be prompted to enter customer identifying information such that a device identifier of the user device 316 can be stored in the data store 306 in association with one or more customer profiles. Advantageously, customers may have photos taken and saved for them without having to present an identity credential, and may increase the accuracy and reliability, and decrease wait times, associated with photography events. In further examples, the photographed customers may subsequently be offered photo products or services based on the photographs linked to the customers' profiles using facial recognition services and systems of the present technology. The user devices 316 may further include applications executing thereon that provide for customer interaction with the data center 302. For example, an application provided by or associated with the operator of the ship may include a graphical user interface allowing the user to perform interactions such as ordering food or beverages, purchasing products, modifying itineraries, and the like.

Product touchpoints 318 may be computing devices consistent with the computing resource 200 of FIG. 2. Similar to crew devices 314, product touchpoints 318 may be stationary or mobile devices operable by crew members. Product touchpoints 318 may be located at sites where items can be purchased and/or at the locations of experiential products such as dining options, entertainment events, activities, and the like. In some embodiments, a product touchpoint 318 may include image capture devices 208 including a still and/or video camera. Accordingly, customers entering experiential products or purchasing items may be positively identified to record attendance or purchases, without requiring the customers to carry physical identity credentials.

Figure 4:
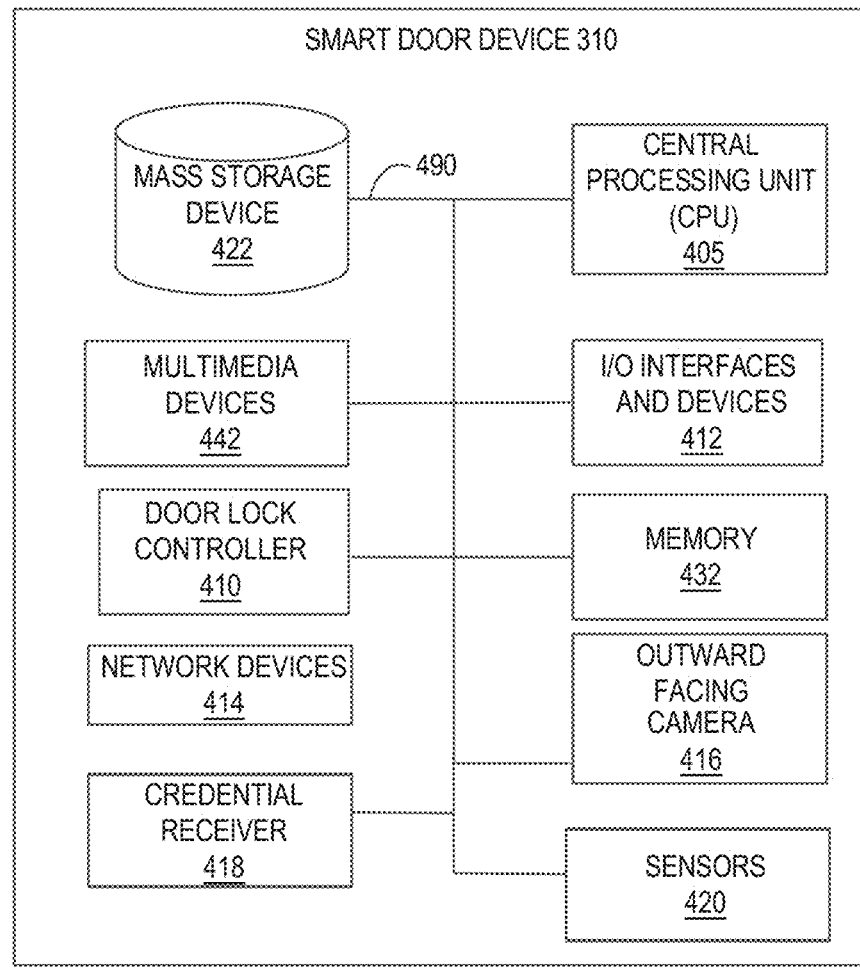
FIG. 4 shows a block diagram of exemplary components of a smart door device in accordance with the present technology.

FIG. 4 illustrates a block diagram of exemplary components of a smart door device 310 participating in the ship-based computing system 300 of FIG. 3, according to an exemplary embodiment. The smart door device 310 may be, for example, a particular implementation of the computing resource 200 of FIG. 2. The smart door device 310 may include, for example, a computing device or system that is IBM, Macintosh, or Linux/Unix compatible or a terminal or workstation. In some embodiments, the smart door device 310 may be an Internet of things (IoT) device. In one embodiment, the smart door device 310 includes one or more central processing units ("CPUs") 405, which may each include a conventional or proprietary microprocessor. In some embodiments, the CPU 405 may perform various computations, associations, etc., of data stored in a data store. Accordingly, the CPU 405 may enable the smart door device 310 to process information in a data store and generate information for transmission to and between other devices.

The smart door device 310 further includes one or more memory 432, such as random access memory ("RAM") for temporary storage of information, one or more read only memory ("ROM") for permanent storage of information, and one or more mass storage device 422, such as a hard drive, diskette, solid state drive, or optical media storage device. Typically, the components of the smart door device 310 are connected using a standard based bus system 490. In different embodiments, the standard based bus system 490 could be implemented in Peripheral Component Interconnect ("PCI"), Microchannel, Small Computer System Interface ("SCSI"), Industrial Standard Architecture ("ISA"), Extended ISA ("EISA"), and networked architectures, for example. In addition, the functionality provided in the components and modules of smart door device 310 may be combined into fewer components and modules or further separated into additional components and modules than as shown in FIG. 4.

The smart door device 310 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the smart door device 310 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary smart door device 310 may include input/output (I/O) devices and interfaces 412 which may include one or more display devices, such as a monitor, that allows the visual presentation of data to a user. More particularly, a display device provides for the presentation of the user interface or GUI, application software data, and multimedia presentations, for example. In some embodiments, the one or more display devices may include a touchscreen monitor configured to display visual content and receive input from a user. In some embodiments, the I/O devices and interfaces may further include commonly available input or output devices such as a keyboard, mouse, touchpad, and printer. The smart door device 310 may also include one or more multimedia devices 442, such as speakers, video cards, graphics accelerators, and microphones, for example.

In the embodiment of FIG. 4, the I/O devices and interfaces 412 provide a communication interface to various external devices. The smart door device 310 may be electronically coupled to one or more networks, for example, one or more of a LAN, WAN, and/or the Internet, via a wired, wireless, or combination of wired and wireless, communication links provided by one or more networking devices 414. For example, the smart door device 310 in this implementation may be electronically coupled to the network 110 and/or to an internal network of the ship-based computing system 102 of FIG. 1 via a wired or wireless connection using the networking devices 414. Other implementations are possible. Using the networking devices 414, the smart door device 310 may communicate over networks with various computing devices and/or other electronic devices via wired or wireless communication links. Additionally, or alternatively, the networking devices 414 may allow the smart door device 310 to communicate with one or more of the user computing devices 316.

In some embodiments, the I/O devices and interfaces 412 may generate or provide the user interface (UI). The UI may allow for customers of the user computing devices 316 to interact with various functionalities of the smart door device 310, such as locking or unlocking a stateroom door, viewing a live electronic peephole feed, viewing or receiving hospitality alerts or notifications, and the like. In some embodiments, the UI allows the customers to update customer information, for example profile information, profile preferences, interests, and so forth. In some embodiments, the UI allows for operators of the ship-based computing system 102 (e.g., crew members or other agents of the ship operator) to perform functions such as reviewing stored customer information, providing items or services based on facial recognition results, or identifying customers on the ship.

The smart door device 310 may further include a door lock controller 410 configured to interface with an electronic lock, a key database, or other component to cause locking and/or unlocking of an electronic lock on the door of the stateroom where the smart door device 310 is installed, as described elsewhere herein.

An outward facing camera 416, as described elsewhere herein, may be included within the smart door device 310 and positioned so as to image an area outside the stateroom door. For example, the outward facing camera 416 may be a wide angle camera having a relatively large field of view (e.g., up to 180 degrees) such that any person or object in the vicinity of the stateroom door can be imaged. The outward facing camera 416 may be configured to capture still images and/or video of its field of view. Images and/or video captured by the outward facing camera 416 may be sent to the mass storage device 422 and/or any other remote devices such as user devices 316 corresponding to customers associated with the stateroom and/or other components of the ship-based computing system 300 such as the data center 302. Images and/or video captured by the outward facing camera 416 may be stored locally in the mass storage device 422 and/or remotely, such as in the data store 306 of the ship-based computing system 300.

A credential receiver 418 may be disposed at an outward-facing portion of the smart door device 310 to receive one or more physical credentials for access control, in addition to or as an alternative to facial recognition-based access control. Example types of credentials that can be detected and/or received at the credential receiver 418 may include, for example, a radio frequency identification (RFID), Bluetooth Low Energy (BLE), or near field communication (NFC) device contained within a wearable, a proximity card, a badge, or other proximity device, a physical key, an access card or key card containing a magnetic stripe or chip, a fingerprint, a retinal scan, or the like. The credential receiver 418 may accordingly include one or more physical components such as an RFID, BLE, or NFC reader, a pin tumbler locker, a magnetic stripe or chip reader, a fingerprint scanner, a retinal scanner, and/or other components as appropriate. The credential receiver 418 is configured to cause the door lock controller 410 to unlock the stateroom door upon receiving a valid credential. In some embodiments, the credential receiver 418 is configured to query one or more data stores such as the mass storage device 422 and/or the data store 306 of the ship-based computing system 300, to determine if a received credential corresponds to a person authorized to enter the stateroom. For example, those authorized to enter may include passengers associated with the stateroom, crew members authorized to access the stateroom for delivery, maintenance, cleaning, or other services, and the like.

One or more additional sensors 420 may further be included within the smart door device 310. The one or more additional sensors 420 may include, for example, a proximity sensor, a microphone, a temperature sensor, a humidity sensor, a near-infrared imaging sensor, or the like.

Figure 5A:
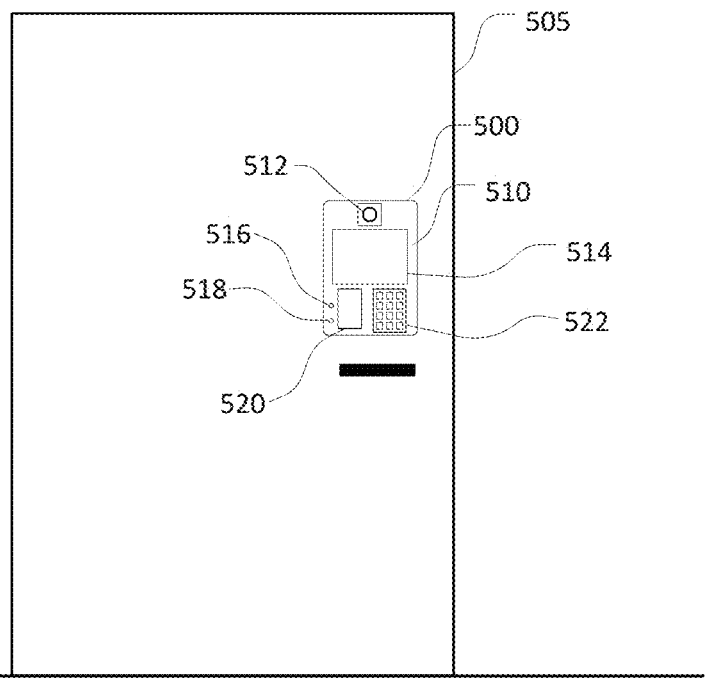
FIGS. 5A and 5B illustrate an example implementation of a smart door device in accordance with the present technology.
Figure 5B:
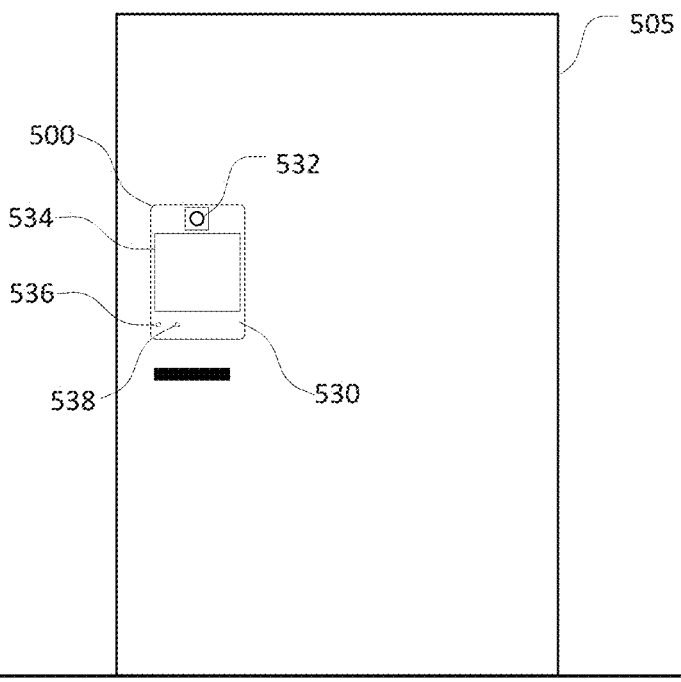

FIGS. 5A and 5B depict an example implementation of a smart door device 500 installed in a stateroom door 505. FIG. 5A shows an exterior view of the stateroom door 505 (e.g., as viewed from a corridor outside the stateroom), including an outward-facing component 510 of the smart door device 500. FIG. 5B shows an interior view of the stateroom door 505 (e.g., as viewed from within the stateroom), including an inward-facing component 530 of the smart door device 500. The outward-facing component 510 and the inward-facing component 530 may each comprise a housing and/or may comprise portions of a single housing. In some embodiments, the smart door device 500 is an example implementation of the smart door device 310 of FIG. 4. Although the outward-facing component 510 and the inward-facing component 530 of the smart door device 500 are illustrated in FIGS. 5A and 5B as opposing sides of a unitary device embedded within the stateroom door 505, it will be understood that the outward-facing component 510 and the inward-facing component 530 may have a variety of other configurations without departing from the spirit or scope of the present disclosure. For example, the outward-facing component 510 and the inward-facing component 530 may be separate components installed on opposing sides of the stateroom door 505, or either or both of the outward-facing component 510 and the inward-facing component 530 may be installed on a wall near the stateroom door 505 rather than within the stateroom door 505 itself. In some embodiments the inward-facing component 530 may be installed anywhere within the stateroom and/or may be a mobile device within the stateroom in wireless communication with the outward-facing component 510. Moreover, some or all of the functionality of the inward-facing component 530 may be embodied in an application executed on a personal computing device of an occupant of the stateroom, instead of or in addition to an inward-facing component 530 physically installed within the stateroom.

As shown in FIG. 5A, the outward-facing component 510 of the smart door device 500 can include an outward-facing camera 512, a display 514, a microphone 516, a proximity sensor 518, a credential receiver 520, and an input 522. As shown in FIG. 5B, the inward-facing component 530 of the smart door device 500 can include a motion detector 532 or other inward-facing sensor, a display 534, a microphone 536, and a proximity sensor 538. Other configurations and/or component combinations of the outward-facing component 510 and the inward-facing component 530 may be included without departing from the spirit or scope of the present technology.

Example Smart Door Implementations of the Present Technology

The advantageous facial recognition implementations described herein may be used throughout the duration of a cruise sailing or other event to improve customer experiences by providing a multifunctional device that can enhance the enjoyment, comfort, and functionality of stateroom accommodations, improve customers' safety and security associated with their stateroom accommodations, avoid the necessity of carrying a wearable or other access credential while on a cruise, and provide anonymized data to a cruise operator for further enhancement of safety and security of all passengers and crew aboard. Several example implementations will now be described with reference to the ship-based computing system 300 of FIG. 3 and the smart door devices 310, 500 of FIGS. 4-5B.

In some embodiments, the smart door devices 310, 500 are configured to perform biometric authentication. For example, customers can gain access to their staterooms using a facial recognition system or other biometric authentication method of the present technology, rather than a key card or other credential. In the data store 306, a customer profile may be linked with a stateroom identifier associated with the customer's reserved or assigned stateroom. While aboard the ship, the customer may unlock the door to the stateroom by showing his or her face at the smart door device 310 integrated with the customer's stateroom, as described above with reference to FIG. 3. When multiple customers, such as family members, are staying together in the same stateroom, each of the corresponding customer profiles in the data store 306 is linked to the stateroom identifier such that any of the family members can individually gain access to the stateroom at any time using facial recognition at the smart door device 310. In addition, a stateroom occupant may grant permission for one or more other customer profiles to be linked with the same stateroom identifier such that a selected group of customers (e.g., other family or friends staying in a different stateroom) can gain access to the occupant's stateroom. In one example implementation, stateroom occupants may be permitted to add other customers to an allowed access list using a self-serve feature of a cruise operator-associated application on the customer's mobile device (e.g., a user device 316 and/or an inward-facing component 530 of the smart door device 500). The stateroom occupant can grant permission at the beginning of a sailing or during the sailing using the cruise operator-associated application. In some embodiments, the application may be configured to limit access to the self-serve feature to certain members of a travel party (e.g., to allow parental control or override functionality, and to ensure adherence to security measures or other onboard regulations). In some embodiments, the self-serve feature may be implemented in a "plan your cruise" feature on the cruise operator's website.

The smart door devices 310, 500 may further be configured to allow an occupant to remotely unlock a stateroom door to allow another customer to access the room. For example, a friend, family member, or other acquaintance of a stateroom occupant may have left an item within the stateroom or otherwise have reason to access the stateroom while the occupant is not present. The other customer may approach the stateroom door and may use the input 522 of the outward-facing component 510 of the smart door device 500 to contact the occupant. The occupant, in a location remote from the stateroom, may receive a notification (e.g., at the occupant's user device 316) of the access request, along with an image, video, or live stream from the outward-facing camera 512. The occupant's user device 316 may further display a selectable option to grant or deny access to the person visible in the image, video, or live stream. If the occupant selects the grant option, the smart door device 310, 500 causes the electronic lock to unlock the door. If the occupant selects the deny option, the smart door device 310, 500 does not cause the electronic lock to unlock the door, and may further provide a notification at the smart door device 310, 500 that access has not been granted (e.g., via the display 514 of the outward-facing component 510).

In addition to granting stateroom access via an electronic lock, the smart door devices 310, 500 can further be configured to provide personalization services to the stateroom occupants. As discussed elsewhere herein, a customer profile in the data store 306 of the ship-based computing system 300 may include user stateroom preferences such as HVAC or climate control preferences, stateroom lighting preferences, in-room media preferences, and the like. In some embodiments, these preferences may include default preferences corresponding to climate control, lighting, media, or other settings to be applied when a user enters their stateroom. The smart door devices 310, 500 can be configured to retrieve user stateroom preference data from the data store 306 when a user enters the stateroom via biometric recognition or a credential, or the user stateroom preferences may be stored at the smart door devices 310, 500 for each of the customers associated with the stateroom. Thus, when a user unlocks his or her stateroom door, the smart door device 310, 500 can identify the particular user that unlocked the door and can apply one or more of the user's default settings by modifying a configuration of a networked appliance within the stateroom in response to the facial recognition result of the identified particular user that initiates the unlocking of the stateroom door. For example, the smart door device 310, 500 of the user's stateroom may set the stateroom thermostat to a desired temperature, turn on a desired combination of room lights, cause an in-room audio system to play a desired type of music, cause a television to turn on and show a desired channel, cause the window shades to move to a desired position, etc. In some embodiments, the smart door devices 310, 500 can apply user stateroom preferences conditionally. For example, the smart door devices 310, 500 may implement a user's stateroom preferences when the user enters the user's unoccupied stateroom alone, but may be configured not to implement one or more of the user's default HVAC/climate control, lighting, or media settings when the user enters the stateroom with one or more other customers and/or when the smart door device 310, 500 determines that another customer is already in the stateroom (e.g., based on a signal from the motion detector 532 or other inward-facing sensor).

The smart door devices 310, 500 may further be configured to grant stateroom access to crew members, for example, using biometric authentication and/or based on a credential received at a credential receiver 418, 520. A crew member may desire to access a stateroom to provide one or more services requested and/or scheduled by an occupant of the stateroom. For example, an occupant may request a delivery of an item such as a newspaper, or a service such as in-room dining, cleaning services, maintenance to repair a broken or malfunctioning appliance, or the like. When a crew member arrives to deliver the item, the crew member may be able to access the interior of the stateroom via the smart door device 310, 500 or based on biometric authentication such as facial recognition.

Crew member access may be provided in accordance with one or more business rules stored in the mass storage device 422 and/or in the data store 306 of the ship-based computing system 300. For example, the smart door device 310, 500 of the stateroom may be configured to allow access to only a particular crew member or subset of crew members (e.g., for in-room dining, the authorized crew may be only the crew member scheduled to deliver the occupant's order or may be limited to the subset of crew members who deliver in-room dining), for example, by adding an identifier of the crew member or subset of crew members to a list of those authorized to access the stateroom stored in a local data store such as the mass storage device S422. In some embodiments, the occupant may schedule the delivery or service during a specified or predetermined time window so that the crew member does not arrive unexpectedly. The occupant may schedule the schedule the delivery or service using the cruise operator-associated application. In such implementations, the smart door device 310, 500 may be configured to allow access to the authorized crew member(s) only during the predetermined time window, and to deny access even if an appropriate crew credential is provided before or after the specified time window. In another example, access may be granted with a short time delay (e.g., 5-30 seconds) if an occupant is detected within the stateroom such that the crew member is required to knock on the stateroom door or to provide time for a notification to be provided within the stateroom. In another example of a business rule for crew member access, an authorized crew member may be granted access to a stateroom only when the smart door device 310, 500 of the stateroom detects, using the facial recognition methods disclosed herein, that two or more crew members are present (e.g., based on detecting two crew members via facial recognition, detecting two or more wireless crew credentials, or a combination of the two). Advantageously, providing access to crew members using a smart door device makes it easier for requested services and deliveries to occur while a guest is elsewhere enjoying the amenities of the ship rather than waiting for a crew member to arrive.

In embodiments of the smart door devices 310, 500 configured for locking and unlocking of a stateroom door, the smart door devices 310, 500 may further be configured to capture and store images and/or video footage corresponding to each unlocking or access event. For example, a record of each unlocking or access event may be stored in a database (e.g., mass storage device 422 or data store 306); the images or video of the area outside the stateroom door captured within a time interval (e.g., 1 second, 2 seconds, 5 seconds, 10 seconds, 20 seconds, or longer) of the unlocking or access event may also be stored in the database in association with the record of the unlocking or access event. Such storage of associated images or video may provide an audit log that can be used to further aid in identifying an individual accessing the stateroom.

In some embodiments, the smart door devices 310, 500 are configured to provide hospitality alerts to customers and/or to the cruise operator. Hospitality alerts may be notifications, status updates, or other alerts associated with any hospitality services. In one particular example of a status update to a customer, the smart door devices 310, 500 may be configured to provide a notification to an occupant when a requested item has been delivered. For example, a newspaper may be delivered to the floor in front of a customer's stateroom door. The smart door device 310, 500 of the customer's stateroom may detect that the delivery has occurred (e.g., based on identifying a crew member delivering the newspaper using facial recognition or based on detecting the newspaper using the outward-facing camera 416, 512), and may alert the customer (e.g., by displaying a notification and/or playing a sound on the display 534 and/or a speaker of the inward-facing component 530 of the smart door device 500, and/or by sending a notification to the occupant's user device 316). Other examples of occupant-directed hospitality alerts may include, for example, a notification to the occupant's user device 316 that a requested cleaning or repair has been completed. In addition to occupant-requested services, the smart door devices 310, 500 may further be configured to provide hospitality alerts at the beginning of a cruise sailing, for example, to notify a customer or group of customers that their stateroom is ready. For example, an embarkation process may typically take about 4 to 6 hours, during which crew members are cleaning and preparing staterooms for the arrival of passengers for the sailing. Accordingly, in the event that a customer boards the ship before the customer's stateroom is fully prepared for the customer's arrival, the smart door device 310, 500 installed at the customer's stateroom may subsequently provide a notification to the customer (e.g., based on facial recognition results associated with the crew members preparing the customer's stateroom) when the stateroom is now ready.

In another example, the smart door devices 310, 500 may be configured to provide hospitality alerts to the cruise operator. For example, a smart door device 310, 500 may detect (e.g., using the outward-facing camera 416, 512) that a room service tray or other item to be collected has been placed outside a stateroom door and may responsively send a notification to one or more crew members that the tray or other item is ready to be picked up. Other notifications to crew that cause a hospitality service to be provided may similarly be provided and may be based on the various facial recognition implementations disclosed herein. Advantageously, hospitality alerts may allow for a more seamless and efficient provision of hospitality services, improving comfort and convenience for passengers and allowing crew members to work more efficiently.

The smart door devices 310, 500 of the present technology may be configured to provide a live view or electronic peephole functionality using the outward-facing camera 416, 512. In some embodiments, a smart door live view may replace a conventional peephole in a stateroom door, for example, by displaying a live stream video or a sequence of still images on a display visible to an occupant of the stateroom. In one example, the live stream video or still images may be displayed on the display 534 of the inward-facing component 530 of the smart door device 500, which may be wall mounted or mobile as described elsewhere herein. In another example, the live stream video or still images may be displayed on a user device 316 corresponding to an occupant of the stateroom, such as an occupant's tablet or smart phone. Display of the live stream or images may be triggered based on a detection of a person near the smart door device 310, 500 (e.g., by outward-facing camera 416, 512 and/or by proximity sensor 538), and/or based on a request from the occupant. In some embodiments, the smart door devices 310, 500 are further configured to identify one or more passengers visible within the area outside the stateroom using the facial recognition processes described herein. In one exemplary implementation, the smart door devices 310, 500 may be configured to augment the live view with identifiers of recognized customers visible within the live view (e.g., when the smart door devices 310, 500 recognizes other customers associated with the occupants of the stateroom, such as family members or other customers with linked itineraries). Advantageously, a live view provided by a smart door device 310, 500 may conveniently allow an occupant to see the area outside the occupant's stateroom and/or identify family or friends present at the stateroom from a location away from the door, either within the stateroom or elsewhere within the ship.

In some embodiments, the smart door devices 310, 500 may further be configured to collect data and/or provide alerts to the cruise operator. In one example, the smart door devices 310, 500 may be configured to provide safety and security alerts based on conditions detected in the proximity of the smart door devices 310, 500. For example, in some embodiments the smart door devices 310, 500 are configured to detect hazardous conditions such as fire, smoke, abandoned packages, unexpected loitering, or other unsafe conditions based on images captured at the outward-facing camera 416, 512. Such hazardous conditions may be detected based on various facial recognition, shape recognition, color recognition, or pattern recognition processes or other known image analysis techniques. Fire or smoke may be detected using a temperature sensor and/or a near-infrared sensor, which may be one of the sensors 420 of the smart door device 310. An array of temperature sensors located at stateroom doors may advantageously detect fires more quickly and with more granularity for precise determination of a fire location, relative to other sensors such as smoke detectors or more sparsely spaced sensors. For example, if each smart door device 310, 500 is configured to send a notification to the server 304 when an abnormal high temperature (e.g., a temperature detected above a predetermined fire alert threshold) is detected, the server 304 may determine one or more fire locations based on the notifications received from several of the smart door devices 310, 500. In another example, a smart door device 310, 500 can be in communication with a door position sensor connected to the associated stateroom door, and may be configured to transmit a security alert when the smart door device 310, 500 determines that the stateroom door has been open for longer than a threshold time (e.g., 1 minutes, 5 minutes, 10 minutes, 15 minutes, or longer). In yet another example, in the case of a person being reported missing or lost by family, friends, or other companions, the various smart door devices 310, 500 may be able to provide a last known location of the missing person. In a mustering event, data from the smart door devices 310, 500 (e.g., door opening/closing data, inward-facing sensor data, etc.) may be used to determine if all customers have actually left their staterooms as required.

In a further example, the smart door devices 310, 500 may be configured for use in one or more health or disease monitoring systems. In some embodiments, one of the sensors 420 may be a thermal imaging sensor (e.g., an infrared imaging sensor, a near-infrared imaging sensor, etc.) configured to determine temperatures of imaged areas based on infrared intensity. For example, the thermal imaging sensor may be configured to determine or estimate the body temperatures of people in the vicinity of a smart door device 310, 500, such as within the field of view of the thermal imaging sensor, to detect customers having a fever or other elevated body temperature condition. In one particular implementation, the thermal imaging sensor may be operable in conjunction with the facial recognition technology described herein. For example, when a smart door device 310, 500 detects the presence of a face based on visible light imaging, a processor of the smart door device may cause the thermal imaging sensor to determine the temperature of the face, a region of the face, such as the forehead or temple region, or a region near the face, such as the neck region. The collected temperature data may be sent to the data center 302 for storage and/or analysis. In some embodiments, the collected temperature data may be stored in association with customers identified using facial recognition, such as for contact tracing of customers determined to have an identified infectious disease. In some embodiments, the collected temperature data may alternatively or additionally be anonymized and aggregated, such as for identifying the presence of a significant number of incidences of fever which may be indicative of the presence of an infectious disease.

In a further implementation of data collection for the cruise operator, the smart door devices 310, 500 may be configured to collect and anonymize data for foot traffic analysis. In one example, each smart door device 310, 500 may be configured to identify each time a person is detected walking by the smart door device 310, 500. Known image analysis algorithms may enable the smart door devices 310, 500 to determine the direction of travel as well. In some embodiments, the smart door devices 310, 500 are further configured to determine how many people are within each group of people walking by, based on the facial recognition technology embodied therein. For example, the smart door device 310, 500 may be configured to detect each face passing by, but may be configured only to detect and not to determine a facial recognition result for those faces that do not stop in front of the smart door device 310, 500, such that foot traffic data remains anonymized. A count may be recorded in the local data store for each anonymous face passing the smart door device. The anonymized foot traffic data may be transmitted to the data store 306 of the ship-based computing system 300, where the data may be stored and further analyzed in an aggregate foot traffic analysis to understand which areas of the ship are relatively busy and which areas are relatively empty. Advantageously, anonymized traffic analysis may enable a cruise provider to better understand the activities of its guests in the aggregate so as to provide a better experience without recording individual passengers' movements undesirably.

Additional Embodiments

It will be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

Although the smart door devices, services and systems described above are generally described in the context of providing access, goods, and/or services to customers of a cruise operator, the teachings of the present technology may be applied in a variety of different contexts. For example, access control may be desirable in the contexts of entertainment events, hotels or other hospitality services and systems, other transportation systems such as airlines, train operators, and the like, banking and other financial services and systems, healthcare services and systems, and health information technology (HIT) services and systems.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or nonvolatile memory devices, CD-ROMs, magnetic tape, flash drives, and optical data storage devices.

What is claimed is:

1. A smart door device for stateroom access control, the smart door device comprising:
a local data store in communication, via a vessel-based network, with a remote data store having stored thereon a plurality of customer profiles associated with individual customers embarked on a vessel, the local data store having stored thereon at least a portion of a subset of the plurality of customer profiles, the subset comprising one or more profiles associated with customers permitted to access a stateroom of the vessel; and
a processor in communication with the local data store, an electronic door lock configured to lock and unlock a door of the stateroom, and a camera positioned to image a public area of the vessel adjacent to the door of the stateroom, the processor configured to:
receive, from the camera, an image of a face of a person disposed within the public area;
locally generate, based on one or more facial recognition software algorithms and the at least a portion of the one or more profiles, a facial recognition result indicating that the person is one of the customers permitted to access the stateroom; and
in response to the facial recognition result:
cause the electronic door lock to unlock the door of the stateroom; and
modify an operational configuration of a networked appliance within the stateroom based at least in part on the customer profile associated with the person.

2. The smart door device of claim 1, wherein modifying the operational configuration of the networked appliance comprises changing at least one of a default climate control setting, a default in-room media setting, a default lighting setting, or a default window shade setting.

3. The smart door device of claim 1, wherein the processor is further in communication with one or more sensors configured to determine whether the stateroom is occupied or unoccupied, the processor further configured to modify the operational configuration of the networked appliance within the stateroom in response to the facial recognition result only if the stateroom is unoccupied.

4. The smart door device of claim 1, wherein the camera is a video camera configured to capture video footage of the public area of the vessel adjacent to the door of the stateroom.

5. The smart door device of claim 4, wherein the processor is configured to display the captured video footage to one or more of the customers associated with the stateroom as a live stream.

6. The smart door device of claim 5, wherein displaying the captured video footage comprises playing the live stream on a display located at least partially within the stateroom.

7. The smart door device of claim 5, wherein displaying the captured video footage comprises transmitting the live stream to a mobile device associated with the one or more of the customers associated with the stateroom.

8. The smart door device of claim 1, wherein the processor is further configured to:
cause an access event record to be stored in the local data store or in the remote data store in response to the facial recognition result; and
cause an image or video of the person to be stored in the local data store or in the remote data store in association with the access event record.

9. The stateroom access control system of claim 1, wherein the processor is further in communication with a door position sensor configured to detect an open or closed status of the door of the stateroom, the processor further configured to generate a security alert when the door of the stateroom is open for longer than a predetermined threshold time.

10. A stateroom access control system comprising:
a plurality of smart door devices according to claim 1, each smart door device disposed within or proximate to a door of a stateroom of the vessel; and
a server in communication with the remote data store and the plurality of smart door devices.

11. A computer-implemented method for stateroom access control, the method comprising:
receiving, at a local data store associated with a stateroom of the vessel via a vessel-based network, at least a portion of one or more profiles from a remote data store, the remote data store containing a plurality of customer profiles associated with individual customers embarked on the vessel including the one or more profiles, the one or more profiles comprising a subset of the plurality of customer profiles and being associated with customers permitted to access the stateroom;
receiving, from a camera positioned to image a public area of the vessel adjacent to a door of a stateroom, an image of a face of a person disposed within the public area;
locally generating, using one or more facial recognition software algorithms, a facial recognition result based on the at least a portion of the one or more profiles, the facial recognition result indicating that the person is one of the customers permitted to access the stateroom; and
in response to the facial recognition result:
causing an electronic door lock to unlock the door of the stateroom; and
modifying an operational configuration of a networked appliance within the stateroom based at least in part on the customer profile associated with the person.

12. The method of claim 11, wherein modifying the operational configuration of the networked appliance comprises changing at least one of a default climate control setting, a default in-room media setting, a default lighting setting, or a default window shade setting.

13. The method of claim 11, further comprising determining whether the stateroom is occupied or unoccupied based on one or more sensors within the stateroom, wherein the operational configuration of the networked appliance is modified in response to determining that the stateroom is unoccupied.

14. The method of claim 11, wherein the camera is a video camera configured to capture video footage of the public area of the vessel adjacent to the door of the stateroom.

15. The method of claim 14, further comprising displaying the captured video footage to one or more of the customers associated with the stateroom as a live stream.

16. The method of claim 15, wherein displaying the captured video footage comprises playing the live stream on a display located at least partially within the stateroom.

17. The method of claim 15, wherein displaying the captured video footage comprises transmitting the live stream to a mobile device associated with the one or more of the customers associated with the stateroom.

18. The method of claim 11, further comprising:
causing an access event record to be stored in the local data store or in the remote data store in response to the facial recognition result; and
causing an image or video of the person from the camera to be stored in the local data store or in the remote data store in association with the access event record.

19. The method of claim 11, further comprising:
receiving, from a proximity sensor positioned to detect a presence of an object within the public area of the vessel adjacent to the door of the stateroom, a signal indicative of the presence of the object; and
causing the camera to capture the image in response to the signal.

20. The method of claim 11, further comprising:
receiving, from an input device proximate the door of the stateroom, an input from the person; and
causing the camera to capture the image in response to the input.

21. The method of claim 11, wherein the at least a portion of the one or more profiles comprises an embarkation image of a face of each of the customers permitted to access the stateroom taken at a time of embarkation on the vessel, and wherein the facial recognition result is generated based at least in part on the embarkation images.

* * * * *

UNITED STATES PATENT AND TRADEMARK OFFICE
CERTIFICATE OF CORRECTION

| | |
|---|---|
| PATENT NO. | : 11,954,956 B2 |
| APPLICATION NO. | : 17/453793 |
| DATED | : April 9, 2024 |
| INVENTOR(S) | : Schneider et al. |

It is certified that error appears in the above-identified patent and that said Letters Patent is hereby corrected as shown below:

In the Claims

In Column 29, Claim 9, Line 20 (Approx.), delete "The stateroom access control system of claim 1," and insert --The smart door device of claim 1,--.

Signed and Sealed this
Sixth Day of August, 2024

Katherine Kelly Vidal
*Director of the United States Patent and Trademark Office*